(12) United States Patent
Shapiro et al.

(10) Patent No.: US 7,876,354 B1
(45) Date of Patent: *Jan. 25, 2011

(54) SYSTEM, METHOD AND ARTICLE OF MANUFACTURE FOR EXECUTING A VIDEO SETUP PROTOCOL

(75) Inventors: Nella Shapiro, San Mateo, CA (US); Jeffrey L. Edwards, Palo Alto, CA (US)

(73) Assignee: Elet Systems L.L.C., Wilmington, DE (US)

( * ) Notice: Subject to any disclaimer, the term of this patent is extended or adjusted under 35 U.S.C. 154(b) by 1510 days.

This patent is subject to a terminal disclaimer.

(21) Appl. No.: 10/274,415

(22) Filed: Oct. 17, 2002

Related U.S. Application Data

(63) Continuation of application No. 09/397,496, filed on Sep. 15, 1999, now Pat. No. 6,489,989.

(51) Int. Cl.
*H04N 17/00* (2006.01)

(52) U.S. Cl. .................................................. 348/180

(58) Field of Classification Search .................. 348/180, 348/187, 154–159, 160, 350, 148, 231, 220, 348/552, 222.1, 362, 207.99, 181, 370; 382/100; 375/231.99; *H04N 17/00*

See application file for complete search history.

(56) References Cited

U.S. PATENT DOCUMENTS

| 5,457,370 | A | * | 10/1995 | Edwards | 318/571 |
|---|---|---|---|---|---|
| 5,592,254 | A | | 1/1997 | Uchiyama | 396/96 |
| 5,625,415 | A | * | 4/1997 | Ueno et al. | 348/350 |
| 5,657,003 | A | | 8/1997 | Fuentes | 348/690 |
| 5,717,848 | A | * | 2/1998 | Watanabe et al. | 345/474 |
| 5,825,413 | A | | 10/1998 | Mullis | 348/155 |
| 5,926,209 | A | | 7/1999 | Glatt | 348/143 |
| 5,953,079 | A | * | 9/1999 | Burl et al. | 348/699 |
| 5,999,213 | A | * | 12/1999 | Tsushima et al. | 348/180 |
| 6,061,462 | A | * | 5/2000 | Tostevin et al. | 382/100 |
| 6,177,958 | B1 | * | 1/2001 | Anderson | 348/362 |
| 6,212,237 | B1 | * | 4/2001 | Minami et al. | 375/240.16 |
| 6,243,103 | B1 | * | 6/2001 | Takiguchi et al. | 345/634 |
| 6,300,976 | B1 | * | 10/2001 | Fukuoka | 348/231.99 |
| 6,421,083 | B1 | * | 7/2002 | Takakura | 348/223.1 |
| 6,456,892 | B1 | * | 9/2002 | Dara-Abrams et al. | 700/83 |
| 6,532,022 | B1 | * | 3/2003 | Ahmad | 345/629 |
| 6,606,117 | B1 | * | 8/2003 | Windle | 348/239 |
| 6,967,680 | B1 | * | 11/2005 | Kagle et al. | 348/222.1 |
| 7,349,011 | B2 | * | 3/2008 | Hirasawa | 348/207.99 |

\* cited by examiner

*Primary Examiner*—Tung Vo
(74) *Attorney, Agent, or Firm*—Workman Nydegger

(57) ABSTRACT

A system, method and article of manufacture are provided for executing a setup protocol. A camera and a visual display device are coupled to a computer. Images are generated by the camera upon activation of the camera. A series of setup tests are then conducted on the images generated by the camera to determine whether the camera and surrounding environmental elements satisfy predetermined criteria of an intended computer vision application for optimal running of the intended computer vision application on the computer. The series of setup tests comprises at least one setup test selected from a library of setup tests.

17 Claims, 15 Drawing Sheets

SYSTEM, METHOD AND ARTICLE OF MANUFACTURE FOR EXECUTING A VIDEO SETUP PROTOCOL

This is a Continuation of prior application Ser. No. 09/397,496, filed Sep. 15, 1999 now U.S. Pat. No. 6,489,989, which is hereby incorporated by reference.

CROSS-REFERENCE TO RELATED APPLICATIONS

This application is related to a U.S. patent application entitled "System, Method and Article of Manufacture for Tracking a Head of a Camera-Generated Image of a Person" filed on Jul. 30, 1999, a U.S. patent application entitled "Method and Article of Manufacture for Detecting Collisions between Video Images Generated by a Camera and an Object Depicted on a Display" filed Jul. 30, 1998, a U.S. patent application Ser. No. 08/951,089 entitled "Method and Apparatus for Model-Based Compositing" by inventor Subutai Ahmad filed on Oct. 15, 1997, a P.C.T. patent application serial number PCT/US98/21999 entitled "Method and Apparatus for Performing a Clean Background Subtraction" by inventor Jeffrey L. Edwards filed on Oct. 15, 1998, and a U.S. patent application Ser. No. 09/174,491 entitled "Method and Apparatus for Performing a Clean Background Subtraction" by inventor Jeffrey L. Edwards filed on Oct. 15, 1998 and which are all incorporated herein by reference in their entirety.

BACKGROUND OF THE INVENTION

1. The Field of the Invention

The present invention relates to performing computer vision processing on video images generated by a camera on a visual display, and more particularly to executing a video setup protocol to determine whether the camera and the surrounding environment satisfy predetermined criteria of an intended application.

2. The Relevant Art

More and more commonly personal computers are becoming equipped with video cameras for generating video images for input into the computer. With these video cameras, users are able to generate video images of themselves and/or their surroundings and view such video images on visual display devices.

Because of the greater availability of personal computers with video cameras, various computer applications involving video images are being created directed towards home users. One type of application uses personal computer video cameras to create an interactive display between images generated by the video camera and images generated by the personal computer. This type of application includes entertainment applications where an image of the subject is superimposed onto a computer generated background environment so that it appears that the subject is actually in the background environment. The background environment images can be of any type from the mundane and everyday such as a room to the fantastic such as the moon or another planet.

One method by which these applications may achieve a realistic integration of the subject's image with the background environment is by using a special effects technique commonly associated with the motion picture and television industries known as blue screen imaging. In traditional blue screen imaging, an image of a subject is taken in front of an evenly lit, bright, fixed-color stationary background (typically blue, but which may be green or even red). A compositing process is then used to replace all the blue in the picture with another image, known as the background plate.

However, transferring this blue screen imaging technique for use in computer applications for personal computer users (such as at-home personal computer users) creates several challenges that must be overcome in order to adequately work in a home environment. For example, the locations of the actors (or subjects) in traditional blue screen imaging shoots have pre-measured markers on the stage to indicate where the actors are to stand during the shoot so that the actors are the proper distance from the camera for the shot. With these markers, actors know exactly where to stand each and every take so that they are always properly positioned.

In contrast, finding a relatively quick and easy way to properly position a subject with respect to the video camera is a challenge for designers of at-home applications. In the home environment, there are usually no markers to indicate to a subject where to stand in relation to the video camera for the proper function of the at-home video application. Making such markers in a home environment can take a lot of time and also may not be suitable for the home environment.

Also, traditional blue screen imaging is typically conducted in a controlled environment such as a sound stage or set in order to create a realistic composite image. In such a controlled environment, the amount of lighting is strictly controlled as well as the location of the lighting with respect to the background. Additionally, these sound stages and sets do not have any extra or unnecessary objects in the background that would interfere with the creation of the final composite image.

In contrast, a home environment is normally not as controlled of an environment as a sound stage or set. Lighting in the home environment is uneven typically with many dark areas and bright areas in each room. Windows and skylights in the home environment can create very bright spots in an otherwise rather dark room. Additionally, light sources in the home environment can be located anywhere in a room: next to walls, in corners, and on ceilings so that light is not directed in any one direction in the room. With such a variance in lighting conditions, applications for use in the home environment attempting to use a compositing technique must have a way to determine whether the lighting conditions in the home environment are adequate to meet the needs of the application. Additionally, such applications also need to be able to indicate lighting problems to a user so that the user can attempt to fix or adjust the lighting in the room to meet the requirements of the application.

The typical at-home environment is not monochromatic like the background of a blue screen imaging sound stage or set, and most home environments are full of objects such as furniture that need to be left out of the composited image. Because of these conditions, designers of such at-home interactive applications need to have a means for separating the subject from the background environment so that the background environment is left out of the composited image. One way to accomplish this determination is to use the presence and absence of motion in order to distinguish the home environment from the subject who is typically moving. However, some of the unwanted objects in the home environment are moving objects such as, for example, window drapes blowing in a breeze, leaves blowing in the wind on a tree visible through a window, and even ceiling fans. The movement of these objects may confuse the application into thinking that these objects are part of the subject and thereby interfere with the application's determination of what is and is not background.

Additionally, there are a number of different personal computer video cameras of varying quality and with a wide range of features and abilities available to at-home users. As a result, designers of at-home video applications must be able to determine whether the video camera being used by a user is suitable for proper running of the application. Additionally, such designers must also be able to set the various personal computer video cameras to their optimal settings for optimal running of the application.

SUMMARY OF THE INVENTION

A system, method and article of manufacture are provided for executing a video setup protocol. Video images generated by a video camera are obtained upon activation of a video camera. A series of setup tests selected from a library of setup tests are conducted on the video images to determine if the video camera and the conditions of surrounding environment are suitable for a subsequent video application using the video camera.

In one embodiment of the present invention, activation of the video camera may include a determination of whether the video camera is functioning and may also include adjustment of the controls of the video camera.

In another embodiment of the present invention, a determination of the relative position of a subject to the video camera may be included. In one such embodiment, this determination may be made by the displaying of a body part frame on the video image so that the angle of the video camera or the position of the subject may be adjusted so that a particular body part of the subject is positioned in the body part frame. A determination of whether the body part is positioned in the body part frame may also be conducted.

In yet another embodiment the series of setup tests may be conducted in a order set forth in a test script. Also, the library of setup tests may include setup tests defined as critical setup tests and those defined as non-critical setup tests. In such an embodiment, the video setup protocol may be aborted upon failure of a critical test while a set of options may be offered upon the failure of a non-critical setup test.

In a further embodiment of the present invention, the frame rate setup test may be included in the library of setup tests for determining whether the rate at which the video camera generates video images is satisfactory for the proper functioning of the subsequent video application. This may be accomplished by first obtaining a predetermined number of video images generated by the video camera and the elapsed time it took to obtain the generated video images. The number of video images obtained in the elapsed time is then compared with a predetermined threshold value to see if the video camera generates video images above a minimum frame rate defined by the threshold value.

In yet a further embodiment of the present invention, a lighting setup test may be included in the library of setup tests for determining whether the environmental lighting satisfies predetermined lighting criteria for optimal functioning of the subsequent video application.

In even another embodiment of the present invention, a motion setup test may be included in the library of setup tests for determining whether excessively moving objects are in the field of view of the video camera and thereby present in the video images generated by the video camera. The library of setup tests may also include a compositing test to determine whether a composite image derived from an image generated by a camera is satisfactory to a user.

In yet another embodiment, a computer program is embodied on a computer readable medium for executing a setup protocol. The computer program includes a code segment for activating a camera to generate images and a code segment for conducting a series of setup tests selected from a library of setup tests on the images generated by the camera to determine whether the camera and surrounding environment elements satisfy predetermined criteria.

These and other aspects and advantages of the present invention will become more apparent when the Description below is read in conjunction with the accompanying Drawings.

DETAILED DESCRIPTION OF THE INVENTION

The present invention provides a technique for executing a setup protocol for determining whether a camera and the surrounding environment are satisfactory for proper functioning of a desired application. In general, the present invention accomplishes this by first activating the camera so that images generated by the camera may be obtained. The position of a subject relative to the camera is then determined and with the images an additional series of setup tests are conducted on the images to determine if the camera and the surrounding environment are suitable for the desired application. The series of setup tests may include one or more setup tests that are selected from a library of setup tests.

Figure 1:
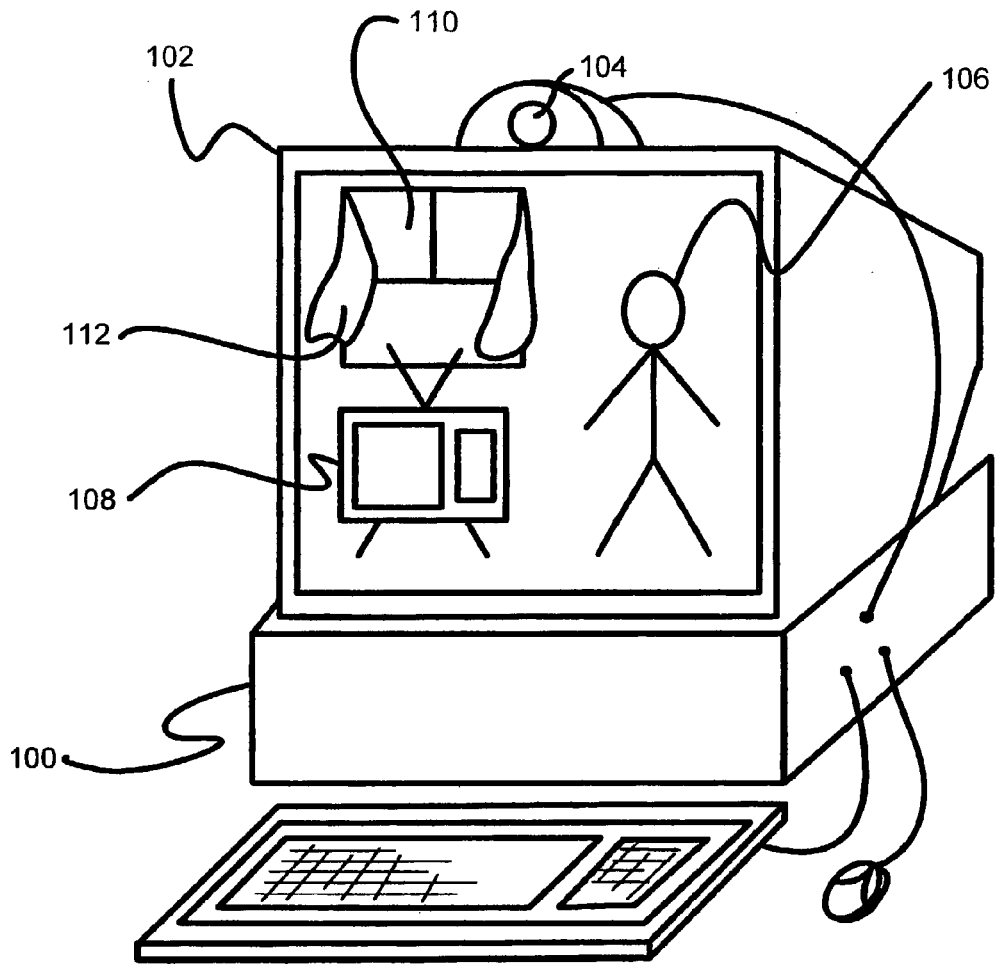
FIG. 1 is a schematic perspective view of a computer with a camera executing a setup protocol according to an embodiment of the present invention.

FIG. 1 is a schematic perspective view of a computer with a camera executing a setup protocol according to an embodiment of the present invention. In FIG. 1, a computer 100 with a visual display device 102 is provided in an environment such as a room in a user's home. A camera 104 is coupled to the computer so that images generated by the camera are displayed on the visual display device. Present in the room may be various objects in the camera's field of view (and, in turn, displayed on the visual display device) which may affect the functioning of application. For example, displayed on the video display in FIG. 1, in the field of view of the camera may be a subject (in this case, the user) 106, a television 108, and an open window 110 with curtains 112 being blown by a breeze passing through the window.

Figure 2:
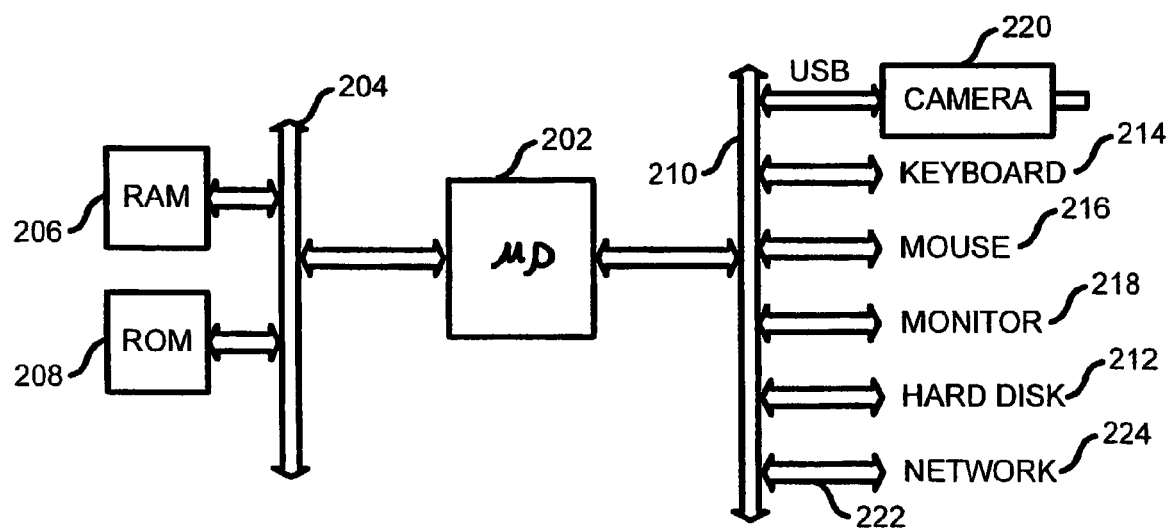
FIG. 2 illustrates an exemplary hardware configuration in accordance with an embodiment of the present invention.

FIG. 2 illustrates an exemplary hardware configuration in accordance with one embodiment of the present invention. A central processing unit 202, such as a microprocessor, and a number of other units are interconnected via a system bus 204. The illustrative hardware configuration depicted in FIG. 2 also includes Random Access Memory (RAM) 206, Read Only Memory (ROM) 208, and an I/O bus 210 for connecting peripheral devices to the bus such as: disk storage units 212, various user interfaces such as a keyboard 214, and a pointer device 216, a visual display device 218. Also connected to the I/O bus via, for example, a Universal Serial Bus (USB), is a camera 220. A communication adapter 222 is also connected to the I/O bus for connecting the hardware configuration to a communication network 224 (e.g., a data processing network).

The hardware configuration typically has resident thereon an operating system such as the Microsoft Windows NT or Windows/98/2000 Operating System (OS), the IBM OS/2 operating system, the MAC OS, or UNIX operating system. Those skilled in the art will appreciate that the present invention may also be implemented on platforms and operating systems other than those mentioned. For example, a game system such as a SONY PLAYSTATION or the like may be employed. Yet another example includes an application specific integrated circuit (ASIC) or any other type of hardware logic that is capable of executing the processes of the present invention. Further, in one embodiment, the various processes employed by the present invention may be implemented using the C++ programming language or the like.

Figure 3:
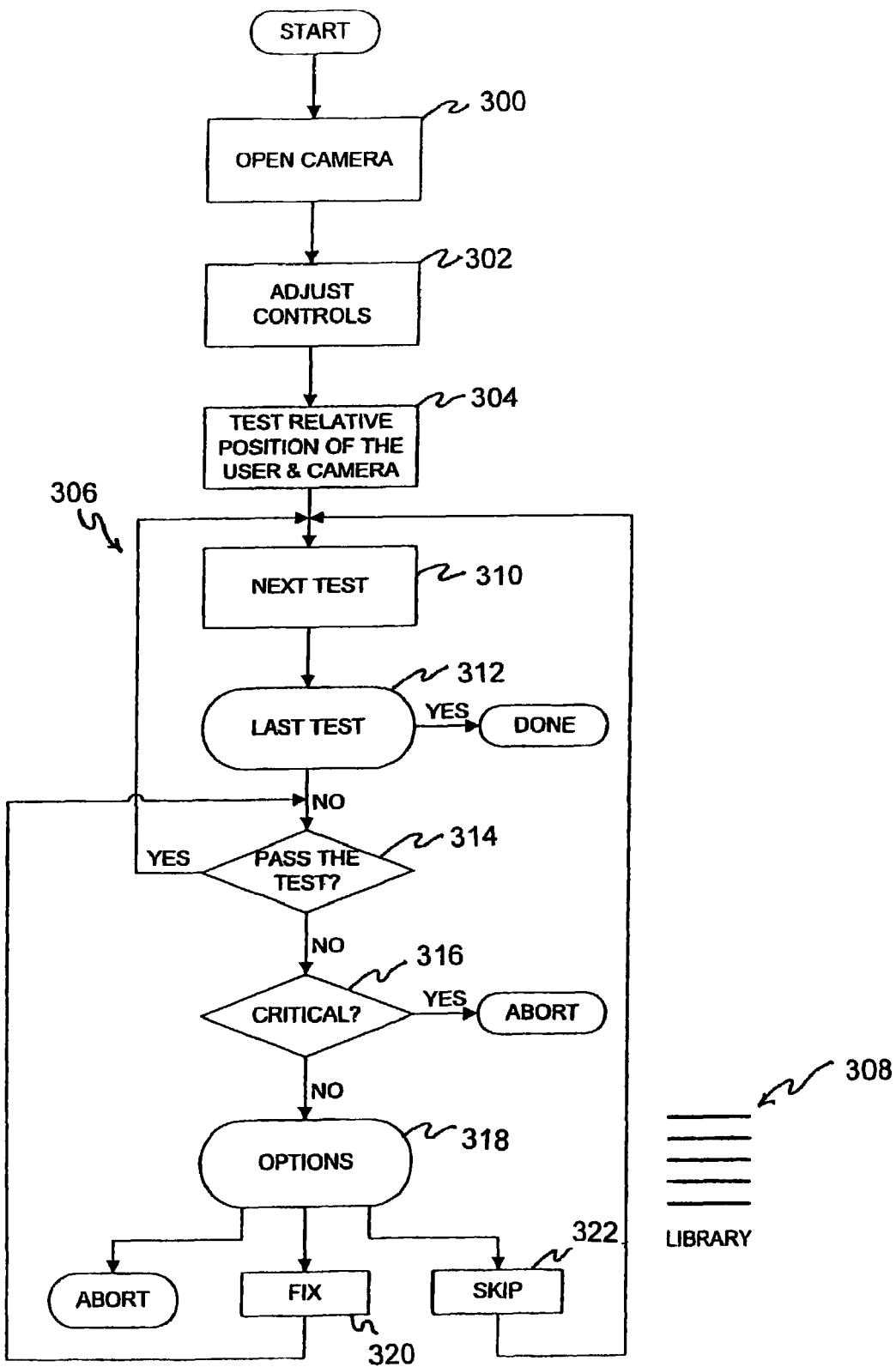
FIG. 3 illustrates a flowchart for a process in accordance with one embodiment of the present invention for executing a video setup protocol to determine whether the camera and the surrounding environment satisfy predetermined criteria of an intended application.

FIG. 3 illustrates a flowchart for a process in accordance with one embodiment of the present invention for executing a setup protocol for determining whether the camera and the surrounding environment (e.g., a room) are satisfactory for proper functioning of a desired application. In operation 300, the camera is activated to generate image frames. The controls of the camera are then adjusted in operation 302. After the camera is activated and its controls have been adjusted, a test is executed in operation 304 for testing the relative position between a subject in the surrounding environment and the camera.

With continuing reference to FIG. 3, one or more setup tests are conducted in series 306 on the images generated by the camera to determine whether the camera and environmental conditions are suitable for the desired application. The setup tests of the series are selected from a library 308 of setup tests than may, for example be stored in memory or obtained via a connection to a network. In operation 310, a setup test is conducted. If the conducted setup test is the last setup test of the series, then in operation 312 the execution of the series of setup tests is completed. If the conducted setup test is passed (in other words, the element or elements being tested by the particular test meet or fall inside the parameters defined by the particular setup test), then in operation 314, the next setup test of the series is conducted (until the last setup test of the series is passed).

If the conducted setup test is not passed (in other words, the element or elements being tested by the particular test fail to meet the parameters defined by the particular setup test) then it is determined in operation 316 whether the failed setup test is defined as a critical setup test or as a non-critical setup test. If the failed setup test is defined as a critical setup test (meaning that the elements tested by this particular setup test are necessary for proper functioning of the desired application to be run), then the setup protocol is aborted.

If the failed setup test is defined as a non-critical setup test, then in operation 318, the user may be presented with a set of options before proceeding to the next setup test. In one such embodiment of the present invention, the user may be offered a choice to abort the setup protocol upon failure of a non-critical setup. As another option in this embodiment of the present invention, the user may be offered a choice to fix the problem with the camera or the surrounding environment in operation 320 and then subsequently have the failed test re-executed to determine if the corrective measures bring the tested parameters inside the parameters of particular setup test. As even another option in this embodiment of the present invention, the user may also be provided the option to skip the failed setup test and to continue with the next setup test of the series as shown in operation 322.

Figure 4:
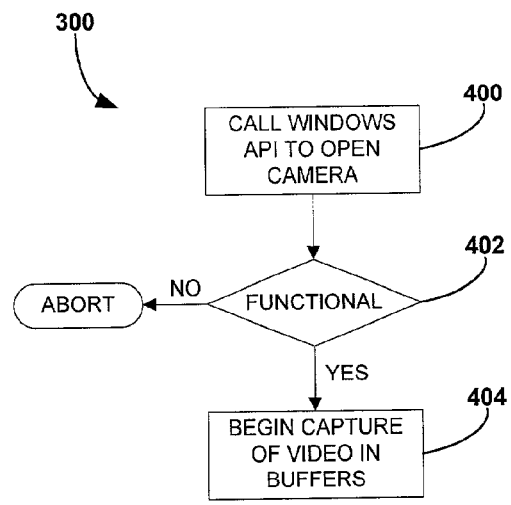
FIG. 4 illustrates a flowchart for a process for activating a camera in accordance with an embodiment of the present invention.

FIG. 4 is a flowchart illustrating operation 300 (the activation of the camera) in more detail. In operation 400, an application program interface (API) of the operating system such as, for example, Microsoft Windows, is called to activate the camera. As shown in operation 402, if the camera is functional, then image frames are generated by the camera which are then captured in a plurality of buffers in operation 404. If the camera is determined not to be functional in operation 402, then the setup protocol is aborted.

In a preferred embodiment, the plurality of buffers in operation 402 may include a "present" or "working on" buffer and a "next" or "coming on" buffer. An image frame that is stored in the "present" buffer is the image frame with which operations of the setup protocol are presently using or extracting information from, while an image frame stored in the "next" buffer is the image that is next in line to be used or have information extracted from by the operations of the setup protocol. In use, once the operations of setup protocol have completed using or extracting from the image frame in the "present" buffer, this image frame is discarded and the image frame in the "next" buffer becomes the new "present" buffer so that it may be used by or have information extracted by the operations of the setup protocol. The now empty former "present" buffer is then filled with a subsequent image frame generated by the camera to become the new "next" frame.

After the camera is determined to be functional, the controls of the camera are adjusted to suit the particular application in operation 302.

Figure 5A:
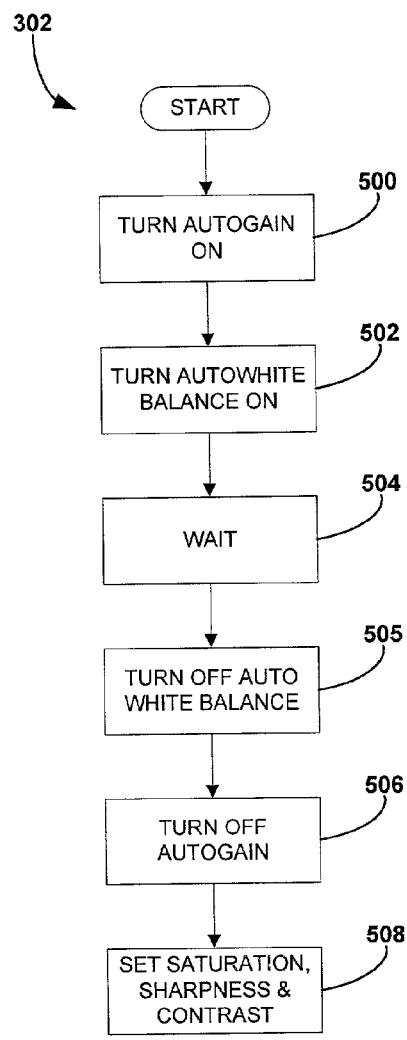
FIG. 5A depicts a flowchart for a process for adjusting the controls of a camera in accordance with an embodiment of the present invention.

FIG. 5A depicts a flowchart for the details of this operation in an embodiment of the present invention for cameras having autogain functions that are able to set the video gain to a level optimal for an intended application (note: for present purposes "optimal" means the best level that the particular camera can achieve for the intended application). Most cameras have an autogain function included in the logic of the camera that is used to adjust the video gain (i.e., brightness level) of the images generated by the camera. In this embodiment of the present invention, the autogain function of the camera is activated in operation 500. If the camera has an auto white balance function, then in operation 502, the auto white balance function is also activated. The auto white balance function is used to adjust the image color, which, for example, is useful for making flesh tones in an image look right.

After waiting a period of time after the autogain and auto white functions have being activated in operation 504, the auto white and autogain functions are deactivated in operations 505 and 506. The wait in operation 504 occurs because no feedback is typically received from the camera when it is conducting its autogain function in order to settle at an optimal video gain value. In one preferred embodiment of the present invention, the duration of the wait in operation 504 may be three seconds. In operation 508, the saturation (or chroma, meaning the intensity of the colors in the active picture), the sharpness and the contrast of the images generated by the camera are then set to the desired levels needed to suit the application.

Figure 5B:
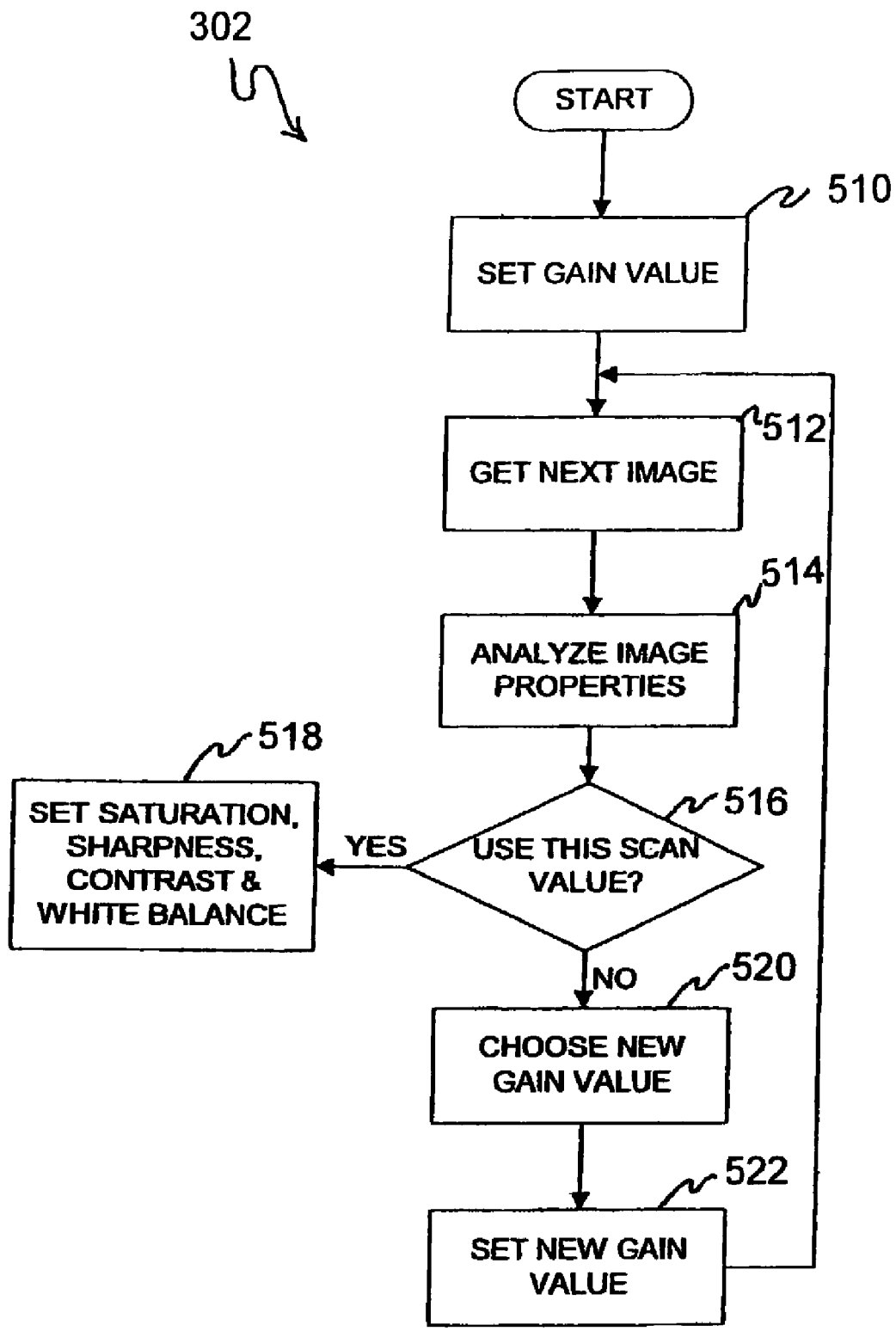
FIG. 5B illustrates a flowchart for another procedure for adjusting the controls of a camera in accordance with an embodiment of the present invention.

However, for cameras that have a poor or inadequate autogain function or are without an autogain function, another procedure may be utilized by the setup protocol to adjust the controls of the camera in order to satisfy the particular application. FIG. 5B illustrates a flowchart for adjusting the controls of cameras with poor autogain functions or without autogain functions. In this embodiment, a gain value is first set in operation 510. An image generated by the camera is then obtained in operation 512 so that properties of this image may be analyzed in operation 514 in order to generate a scan value. In operation 516, it is then determined whether the generated scan value is optimal for the particular application. If the generated scan value is determined to be optimal, then the saturation, sharpness, contrast, and white balance of the images generated by the camera are set in operation 518.

If, on the other hand, the scan value is determined not to be optimal for the particular application, then a subsequent new gain value is chosen in operation 520. Gain value is a monotonic function. Therefore, when choosing a new gain value in operation 520, if the scan value indicates that the image is too dark, then the new gain value chosen should be higher than the old gain value, and if the scan value indicates that the image is too bright, then the new gain value chosen should be lower than the old gain value. The newly chosen gain value is then set in operation 522 and operations 512, 516, and 518 are repeated as shown in FIG. 5B until a optimal scan value is determined.

Figure 6:
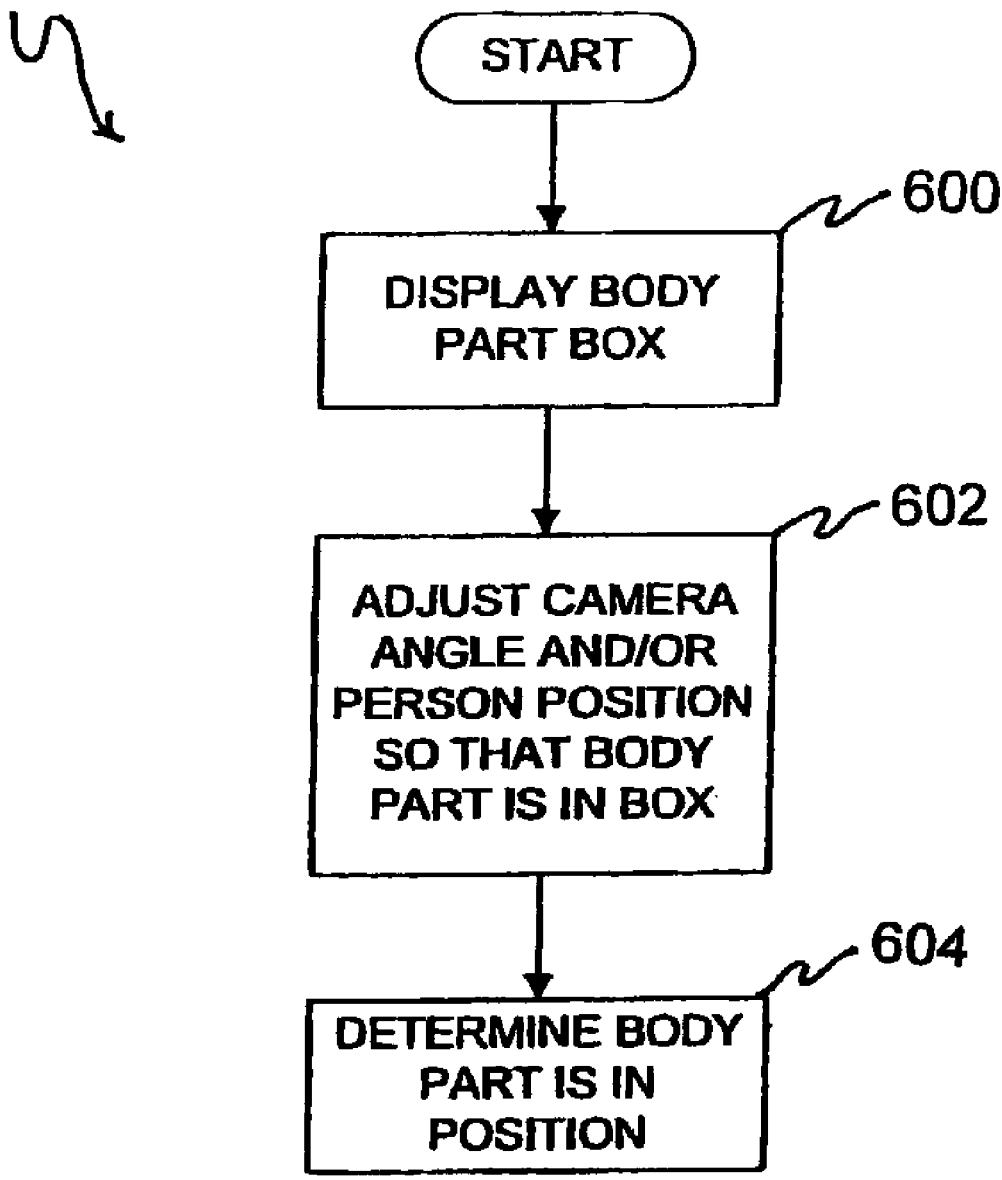
FIG. 6 illustrates a flowchart for a process for testing of the relative position between a subject and the camera according to an embodiment of the present invention.

FIG. 6 is a flowchart illustrating the details for the testing of the relative position between a subject (e.g., a person) in the surrounding environment and the camera conducted in operation 304 according to an embodiment of the present invention. Specifically, in operation 600, a body part frame or box is superimposed onto the image generated by the camera. While the body part box 604 may be rectangular in shape in a preferred embodiment of the present invention, it should be clearly understood by those skilled in the art that the body part box may be of any shape including, for example, a circle, a triangular, or any other suitable polygon.

Turning to operation 602, the angle of the camera and/or position of the subject is then adjusted so that a video generated image of the particular body part of the subject is positioned inside the boundary of the body part box. In a preferred embodiment of the present invention, the subject's particular body part may be the subject's head. However, it should be clearly understood by those skilled in the art that any body part may be chosen by this protocol as the particular body part to be recognized such as, for example, the subject's hand, arm, leg or a foot.

In operation 604, it may be determined whether the particular body part of the subject is properly positioned in operation. In one preferred embodiment of the present invention, this determination may be conducted by querying the user. As an illustrative example, a message may be displayed in a dialog box requesting that a displayed "yes" button be selected once the subject's particular body part is in the boundary of the body part box to indicate to the setup protocol that the subject is in position. In another optional embodiment of the present invention, a body part tracking system, such as a head tracking system, may be used to determine whether the subject's body part is inside the boundary of the body part box. More information regarding the determination whether the particular body part of the user is properly positioned according to this embodiment of the present invention may be found in a patent application entitled "System, Method and Article of Manufacture for Tracking a Head of a Camera-Generated Image of a Person" filed on Jul. 30, 1999 and another patent application entitled "Method and Article of Manufacture for Detecting Collisions between Images Generated by a Camera and an Object Depicted on a Display" filed Jul. 30, 1998 which are both incorporated herein by reference in their entirety.

Figures 7, 8:
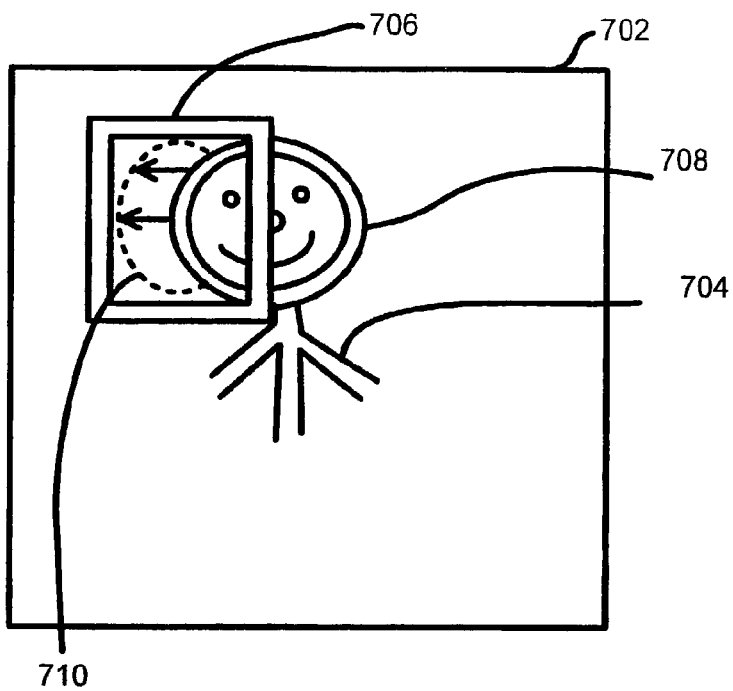
FIG. 7 is a schematic plan view of visual display device with an illustrative image being displayed thereon during a process for testing of the relative position between a subject and the camera in accordance with an embodiment of the present invention.
FIG. 8 shows an ordered table of a setup test library according to an embodiment of the present invention.

FIG. 7 illustrates an illustrative image that may be displayed on the visual display device during operation 304 and the flowchart of FIG. 6 according to a preferred embodiment of the present invention. In FIG. 7, displayed on the visual display device 702 is an image of subject 704 that is in the field of view of the camera. Also displayed on the visual display device is a body part box 706 superimposed onto the displayed image. The image of the subject's head 708 is offset in relation to the body part box. As performed in this illustration embodiment of operation 702, the angle of the camera may be adjusted or the subject's head be moved so that the image subject's head is positioned inside the boundary of the body part as illustrated by the broken circle 710 so that it may be determined that the subject's head is in the proper position with respect to the camera per operation 604.

FIG. 8 is an ordered table of a possible setup test library 308 according to an embodiment of the present invention. Included in this embodiment of the setup test library are a plurality of setup tests that may include for example: (1) a frame rate setup test 800; (2) a lighting setup test 802; (3) a motion setup test 804; and (4) a compositing test 806.

The table illustrated in FIG. 8 also includes a column indicating the criticality of each setup test of this embodiment of the setup test library. Criticality for present purposes is defined as whether the particular passing of particular setup test is critical for functioning of the application for which the setup protocol is designed. In other words, a critical setup test (such as the frame rate setup test 800) is defined as a setup test that if failed when conducted, leads to aborting of the setup protocol as required by operation 316. A non-critical setup test (as the lighting setup test) is defined for purposes of the present invention as a setup test that the setup protocol may allowed to be skipped (see operation 322) without aborting of the setup protocol. However, it should also be clearly understood that the criticality of a setup test be customizable to suit the particular application. For example, in an illustrative setup test library for an illustrative application, it may be desired that the lighting setup test be a critical test and therefore the criticality of the lighting setup for this illustrative setup test library be set to critical.

Figure 9:
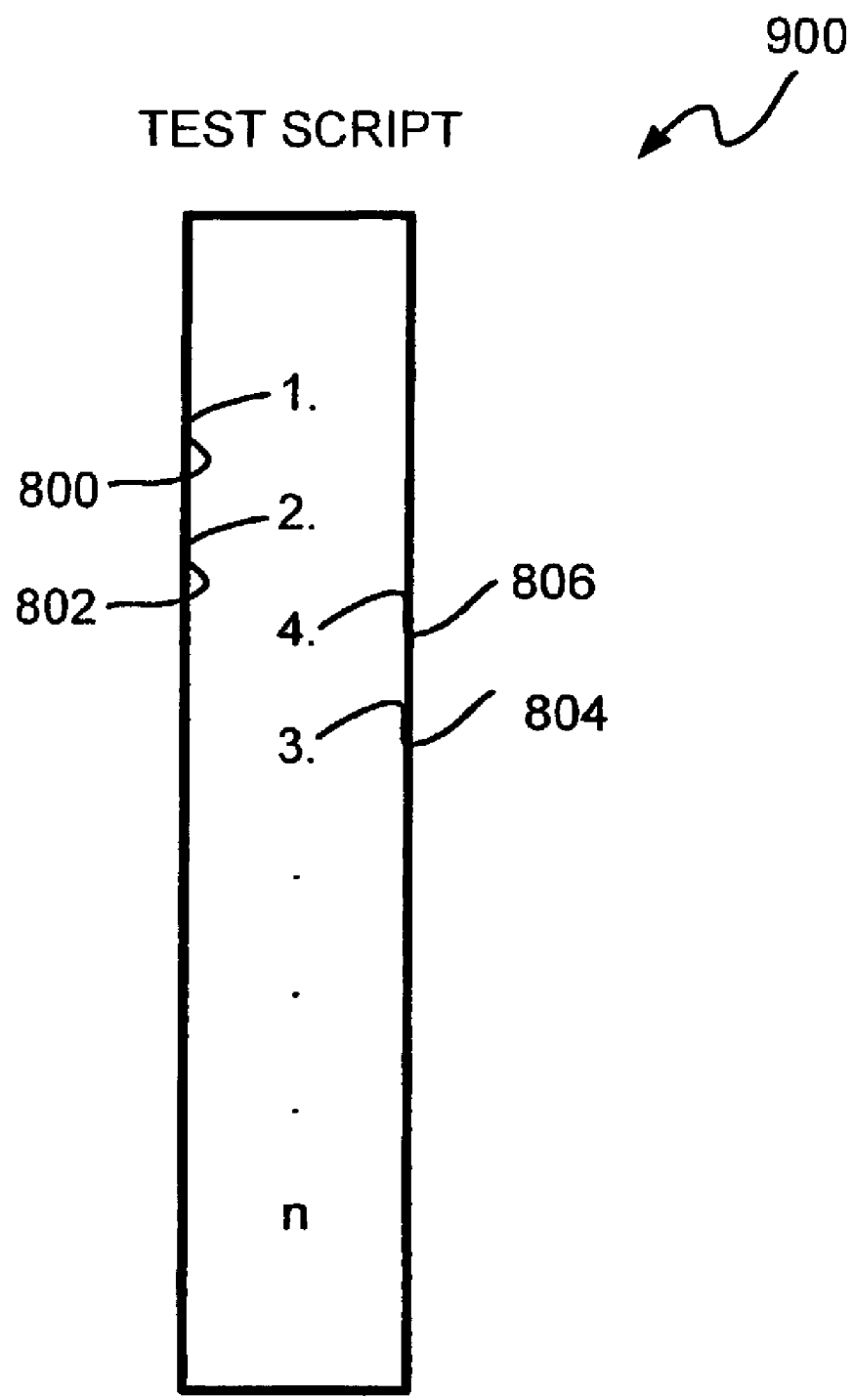
FIG. 9 shows an illustrative test script according to an embodiment of the present invention.

FIG. 9 shows an illustrative setup test script 900 according to an embodiment of the present invention. The setup test script sets forth a setup test order which indicates to the setup protocol which setup tests from the setup test library are to be conducted during the setup protocol and the particular order in which these setup tests are to be conducted during the setup protocol. For example, in FIG. 9, the order of setup tests for an illustrative execution of the setup protocol starts out as: 1, 2, 4, 3, which according to the setup test library of FIG. 8 indicates that the order of conducting the setup tests to start with the frame rate setup test, followed by the lighting setup test, then the compositing setup test, and then motion setup test. Setup test scripts may be designed for satisfying the needs of a particular intended application or designed for each type of camera that may be used in the system.

Figure 10:
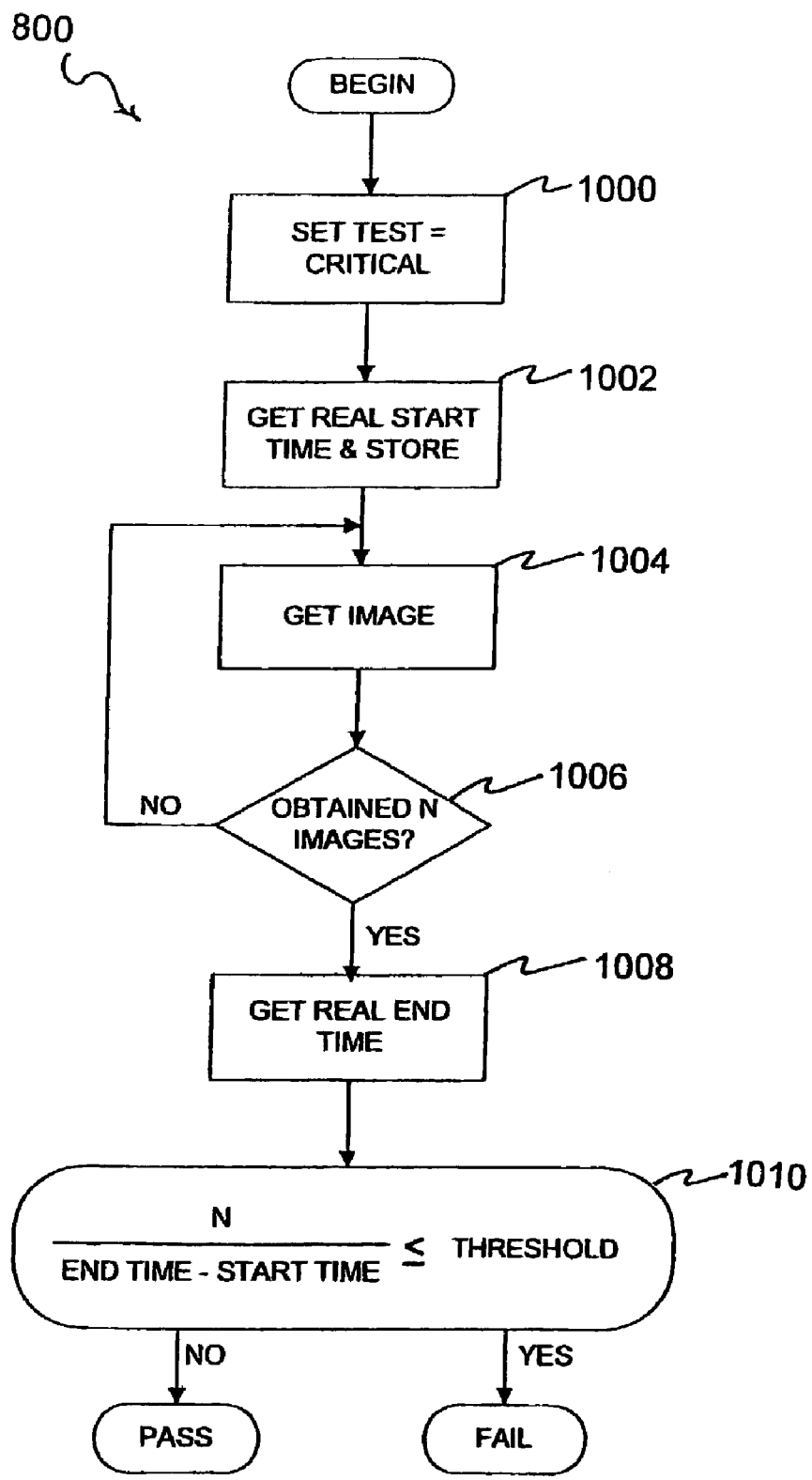
FIG. 10 illustrates a flowchart for conducting a frame rate setup test in accordance with an embodiment of the present invention.

FIG. 10 illustrates a flowchart for conducting the frame rate setup test 800. A purpose of the frame rate setup test is to determine whether the rate at which the camera generates images can satisfactorily meet the needs of the particular application to be run. To conduct the frame rate setup test, the setup test criticality is first set in operation 1000 as a critical test based on the information from the setup test library. Next, in operation 1002, a real start time is set and stored in memory. A predetermined number ("N") of image frames generated by the camera are then obtained immediately after the setting of the real start time in operation 1004. In a preferred embodiment of the frame rate setup test, the predetermined number of image frames obtained may be thirty two image frames. Immediately after the point the predetermined number of images has been obtained (see operation 1006) a real end time is set in operation 1008. In one embodiment of the frame rate setup test, the real start and stop times may be obtained from the CPU timer.

In operation 1010, the real start time is subtracted from the real end time to obtain an elapsed time. The number of obtained image frames is divided by the elapsed time to derive a frame rate (i.e., number of image frames per unit of time) which is compared to a predetermined threshold value (also represented in terms of image frames per unit time. This is represented in operation 1010 by the algorithm:

$$\frac{N}{\text{END TIME} - \text{START TIME}} \leq \text{THRESHOLD VALUE},$$

where N equals the number of obtained image frames. The threshold value represents the minimum number of image frames per unit time that must be generated by the camera in order to meet the requirements of the particular application. As shown in FIG. 10, the frame rate setup test is failed when the frame rate is less than or equal to the threshold value and passed when the frame rate is greater than the threshold value.

In an embodiment where the frame rate setup test is defined as a critical setup test, failure of the frame rate setup test leads to the aborting of the setup protocol per operation 316 of FIG. 3.

In an illustrative preferred embodiment of the frame rate setup test, N may equal 32 image frames and the threshold value may equal 4 frames per 250 milliseconds. In this example, if it takes more then 2000 milliseconds for the camera to generate 32 image frames, then the frame rate setup test is failed. If, on the other hand, it takes less than 2000 milliseconds for the camera to generate 32 image frames, then the frame rate setup test is passed.

Figure 11:
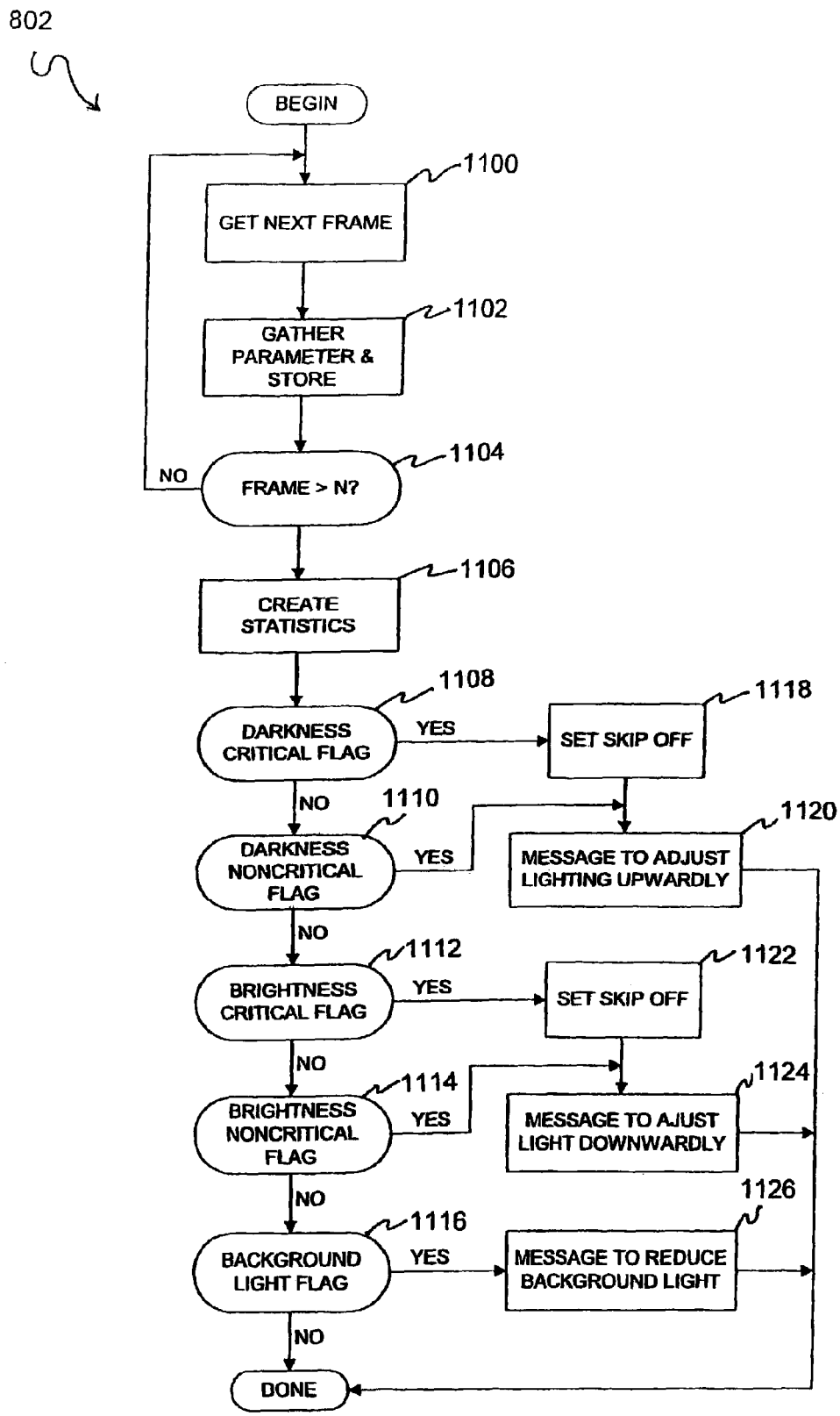
FIG. 11 illustrates a flowchart for a conducting a lighting setup test in accordance with an embodiment of the present invention.

FIG. 11 illustrates a flowchart for a process for a lighting setup test 802 for determining whether the intensity of the environmental lighting satisfies predetermined lighting criteria, in other words, whether the environmental lighting intensity compatible with the algorithms of the intended application so that the algorithms (and thus the intended application) properly work. If the light intensity is too light or too dark, the values obtained from the generated images may not suit algorithms of the particular application and thereby lead to the failure in the execution of the particular application.

With reference to FIG. 11, a predetermined number ("N") of image frames are collected (see operations 1100 and 1104). In a preferred embodiment of the present invention, thirty two image frames may be obtained. Lighting parameters are gathered and stored from each of the collected image frames in operation 1102. From the gathered lighting parameters, statistics are created in operation 1106 and compared to predetermined criteria, or thresholds to set various indicators or "flags". In operations 1108, 1110, 1112, 1114, and 1116, the various flags are checked to determine if any of the flags have been set. If it is determined that one of the flags has been set, an indication is presented (see operations 1120, 1124, and 1126) indicating a particular solution for correcting the environmental lighting to suit the particular intended application. If none of the lighting criteria flags are found to be raised during the checking of the flags, then the lighting test is completed and passed.

In one embodiment of the present invention, five different flags may be set and checked in the lighting test as set forth in the flowchart in FIG. 11 including: a Darkness Critical Flag, a Darkness Non-Critical Flag, a Brightness Critical Flag, a Brightness Non-Critical Flag, and a Background Light Flag.

In a preferred embodiment, the Darkness Critical Flag may be the first flag to be checked to see if it has been set in operation 1108. If the Darkness Critical Flag has not been set, then the next flag in this preferred embodiment to be checked to see if set may be the Darkness Non-Critical Flag in operation 1110. Again, if the Darkness Non-Critical Flag has not been set, the Brightness Critical Flag may be checked next to see if it was set in operation 1112. If the Brightness Critical Flag has not been set, then in operation 1114, then the Brightness Non-Critical Flag may be checked in this preferred embodiment to see if it has been raised. Finally, if the statistics fail to set the Brightness Non-Critical Flag in this preferred embodiment, the statistics are compared to the Background Light Flag in operation 1116 at which point the Lighting Setup Test is passed if the statistics failed to set the Background Light Flag.

In closer detail, the Darkness Critical Flag is raised when the statistics created to from the image frames indicate that the environmental lighting is simply too dark for the algorithms of the intended application to function properly (i.e., the intended application will not work with the present environmental lighting). If the check in operation 1108 determines that the Darkness Critical Flag has been set, then the skip option of operation 322 of FIG. 3 is turned off in operation 1118 and an indication is provided in operation 1120 to indicate that the environmental lighting needs to be increased. In one preferred embodiment of the present invention, this indication of operation 1120 may include a message displayed on the visual display device indicating that the lighting be adjusted upwardly (i.e., increased). As a result of the turning off of the skip option, a user must either fix the problem (per operation 320) as indicated by the message in operation 1120 for the setup protocol to continue or abort the setup protocol (see FIG. 3).

The Darkness Non-Critical Flag is set when the statistics created from the image frames indicate that the environmental lighting is too dark for optimal execution of the intended application but sufficient environmental lighting for the algorithms of the intended application to function properly (i.e., the intended application will work with the present environmental lighting, however, an increase in the environmental lighting will help optimize the user's experience with the intended application). If the check in operation 1110 determines that the Darkness Non-Critical Flag has been set, then the indication of operation 1120 is provided to request that the lighting of the surrounding environment be increased. In contrast to the Darkness Critical Flag check of operation 1108, the skip option of operation 322 is left on (i.e., not turned off as is in operation 1118 for the Darkness Critical Flag) for the Darkness Non-Critical Flag so that the user has the ability to choose between the options of aborting the setup protocol, fixing the problem with the lighting, and skipping to the next setup test of the setup test script.

The Brightness Critical Flag is raised when the statistics created from the image frames indicate that the environmental lighting is simply too bright for the algorithms of the intended application to function properly (i.e., the intended application will not work with the present environmental lighting). If the check in operation 1112 determines that the Brightness Critical Flag has been set, then the skip option of operation 322 is turned off in operation 1122 and an indication is provided in operation 1124 to indicate that the environmental lighting needs to be decreased. In one preferred embodiment of the present invention, this indication of operation 1124 may include a message displayed on the visual display device indicating that the lighting be adjusted downwardly (i.e., decreased). Similar to the situation of the Dark Critical Flag, the turning off of the skip option of operation 322 requires a user to either fix the problem as indicated by the message in operation 1124 or abort the setup protocol.

The Brightness Non-Critical Flag is set when the statistics created from the image frames indicate that the environmental lighting is too bright for optimal execution of the intended application but sufficiently dark enough for the algorithms of the intended application to function properly (i.e., the intended application will work with the present environmental lighting, however, a decrease in the environmental lighting will help optimize the user's experience with the intended application). If the check in operation 1114 determines that the Brightness Non-Critical Flag has been set, then the indication of operation 1120 is provided to request that the lighting of the surrounding environment be decreased. Similar to the Darkness Non-Critical Flag check of operation 1110, the skip option of operation 322 is left on so that the user has the ability to choose between the options of aborting the setup protocol, fixing the problem with the lighting, and skipping to the next setup test of the setup test script.

The determination for setting the Background Light Flag in operation 1106 is made by looking for highly concentrated areas of very saturated light in the camera's field of view that will interfere with the optimal execution of the intended application. If the check for the setting of the Background Light Flag in operation 1116 determines that the Background Light Flag has been set, then an indication is provided in operation 1126 to indicate that the background light needs to be reduced. Preferably, like the other indications in operations 1120 and 1124, this indication comprises a message indicating that the background light needs to be reduced. Like in the cases of operations 1110 and 1114, the skip option of operation 322 is left on when it is determined in operation 1116 that the Background Light Flag has been set so that a user has the ability to choose between the options of aborting the setup protocol, fixing the problem with the background light, and skipping to the next setup test of the setup test script.

Figure 12:
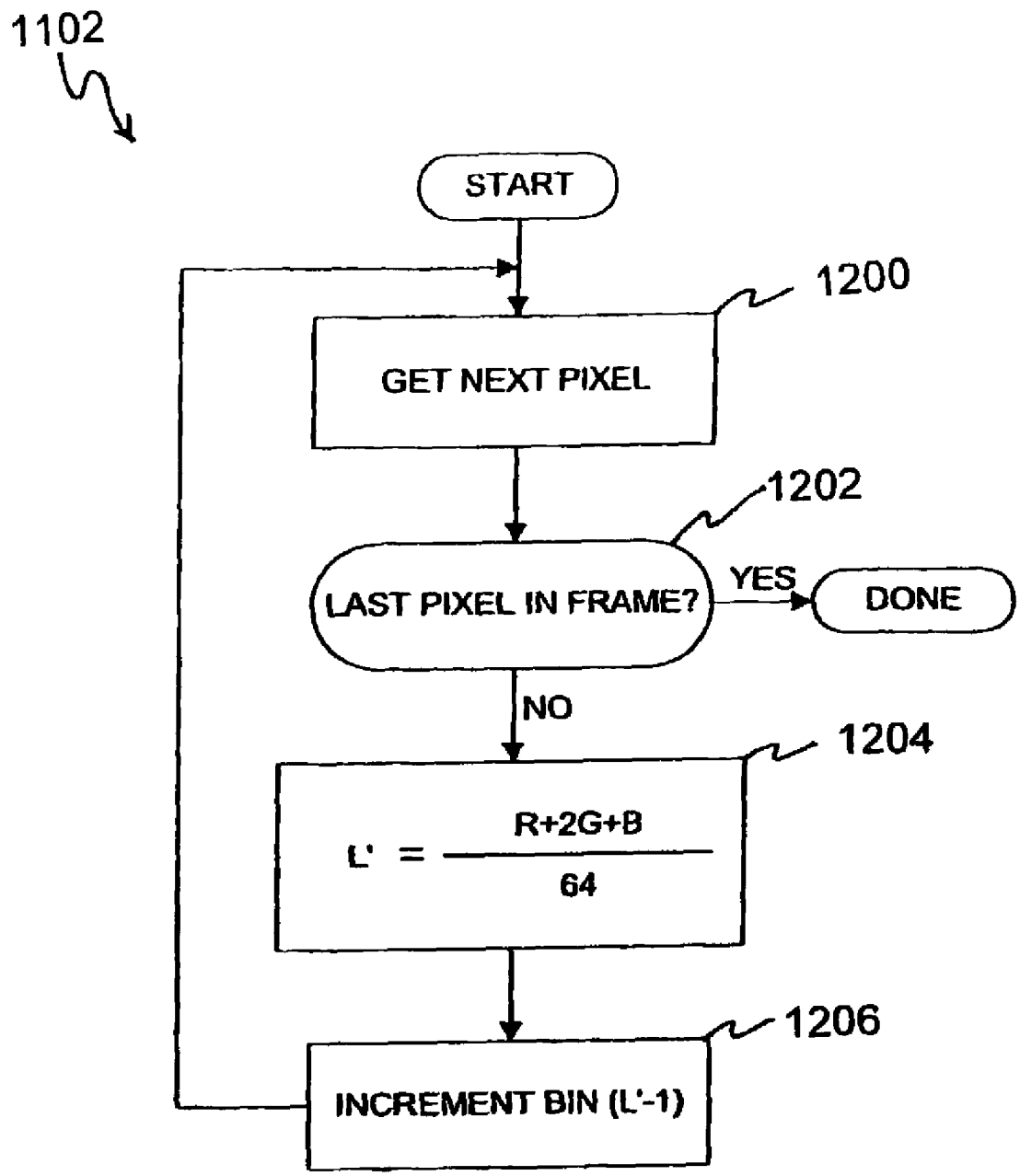
FIG. 12 illustrates a flowchart for a process for gathering and storing of parameters in a lighting setup test in accordance with an embodiment of the present invention.

FIG. 12 shows a flowchart for a process for gathering and storing of parameters in operation 1102 of FIG. 11 for each of the "N" number of image frames. In this process, a conversion is performed on each pixel of each of the "N" image frames (see operations 1200, 1202, and 1204) to obtain a representative luminance value (which represents the brightness of the particular pixel) for each pixel from the red, green and blue components of the pixel. In a preferred embodiment of the present invention, an algorithm for this conversion for each pixel may be represented by:

$$L' = \frac{R + 2G + B}{64}$$

where L' is the representative luminance value (having a value between 0 and 15) representing luminance "L" (with a value between 0-255) divided by 16; R is the intensity of the red color component of the pixel (with a value between 0-255); G is the intensity of the green color component of the pixel (with a value between 0-255); and B is the intensity of the blue color component of the pixel (with a value between 0-255).

Figure 12A:
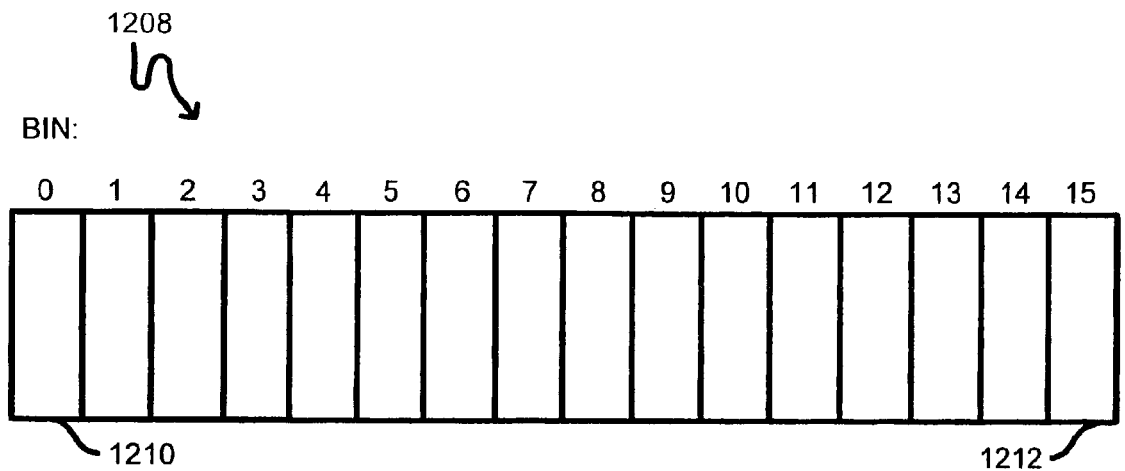
FIG. 12A is a schematic illustration of a histogram having plurality bins for a lighting setup test according to an embodiment of the present invention.

The L' values of all of the pixels from each particular image frame are then incremented in a histogram data structure in operation 1206 in order to develop lighting statistics from the obtained image frames. FIG. 12A illustrates an embodiment of the histogram data structure 1208 comprising 16 bins ranging for a 0 bin 1210 to a 15 bin 1212. In this embodiment, for each pixel of an image frame during the execution of operation 1206, an increment (i.e., a "1") is placed into the appropriate bin into which the L' value of the particular pixel falls. For example, if the L' value of a particular pixel falls between the values 1 and 2, then a "1" is placed in the 1 bin for that particular pixel. This process is repeated for each of the pixels of particular image frame to result in an array being formed in the histogram. Operations 1200, 1202, 1204, and 1206 are also executed for each of the "N" number of image frames so that a histogram array is formed for each of the "N" number of image frames.

Figure 13:
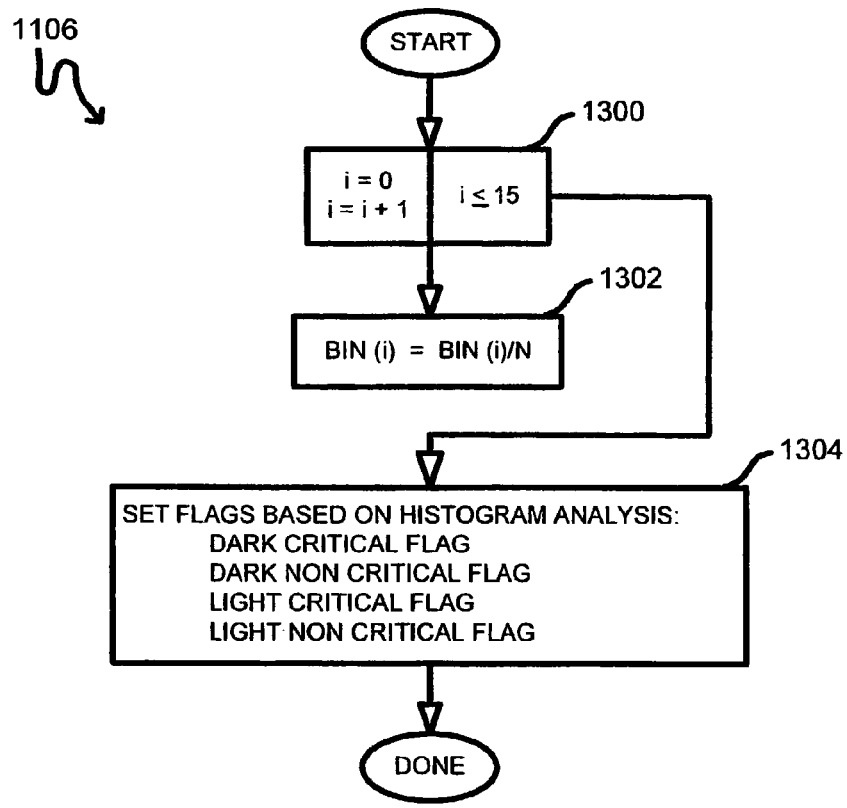
FIG. 13 illustrates a flow chart for a process of the present invention for creating of statistics for a lighting setup test in accordance with an embodiment of the present invention.

FIG. 13 is a flow chart illustrating a process carried out in operation 1106 of FIG. 11 for the creation of statistics that are used to set the flags that are checked in operations 1108, 1110, 1112, 1114, and 1116 of FIG. 11. In operations 1300 and 1302, the "N" number of histogram arrays are added together with each bin of each histogram array being summed together with its corresponding bins of the other histogram (e.g., all 1 bins are added together, all 2 bins are added together, and so on) and then averaged by dividing by "N" to obtain an average histogram array having an average bin value for each of its 16 bins (e.g., the 1 bin of the average histogram array is the average of the sum of all of the 1 bins generated from the "N" number of video frames, the 2 bin of the average histogram array is the average of the sum of all of the 2 bins generated from the "N" number of video frames, and so on). This average histogram array is the created "statistic" which is analyzed in operation 1304 by being applied to all sorts of thresholds or "rules" to answer various "questions" regarding the brightness of the environment in order to determine whether a particular flag is to be set.

As an example for some rules that may be used during operation 1304, rules for setting the various flags in a preferred embodiment of the present invention are as follows:

Darkness Critical Flag Rule:
If (Bin 0+Bin 1+Bin 2+Bin 3+Bin 4)>40 OR
Bin 5>50
Then the Darkness Critical Flag is set.
Brightness Critical Flag Rule:
If AVE (Bin)>190 OR
(Bin 4+Bin 15)>40
Then the Brightness Critical Flag is set.
Background Light Flag Rule:
If Bin 5>20
Then the Background Light Flag is raised.
Brightness Non-Critical Rule:

$$\text{If } \sum_{i \geq 0}^{4} \text{Bin } [i] = 0 \text{ AND Bin } [8] >= 15 \text{ AND}$$

(Bin [7]<10) OR
(Bin [8]≧15 AND Bin [9]>=15 AND Bin [14]>=0))
Then the Brightness Non-Critical Flag is set.
Darkness Non-Critical Rule:
Bin [4]>=25 OR $$\sum_{i \geq 0}^{4} \text{Bin } [i] >= 25 \text{ AND Bin } [9] <= 5 \text{ OR}$$

Bin [14]=0 AND Bin [7]>=15 OR
Bin [5]>=15 AND Bin [6]>=20 AND Bin [14]>=0

$$\text{Bin } [7] < 15 \text{ AND } \sum_{i \geq 0}^{4} \text{Bin } [i] >= 15$$

Bin [6]>20 AND Bin [7]>15 AND Bin [8]<15 OR $$\sum_{i \geq 0}^{3} \text{Bin } [i] >= 15 \text{ AND Bin } [4] < 15 \text{ AND } \sum_{i \geq 0}^{4} <$$

$$40 \text{ OR AND } \sum_{i \geq 0}^{3} \text{Bin } [i] < 10 \text{ AND Bin } [9] < 15$$

Then the Darkness Non-Critical Flag is set.

Figure 14:
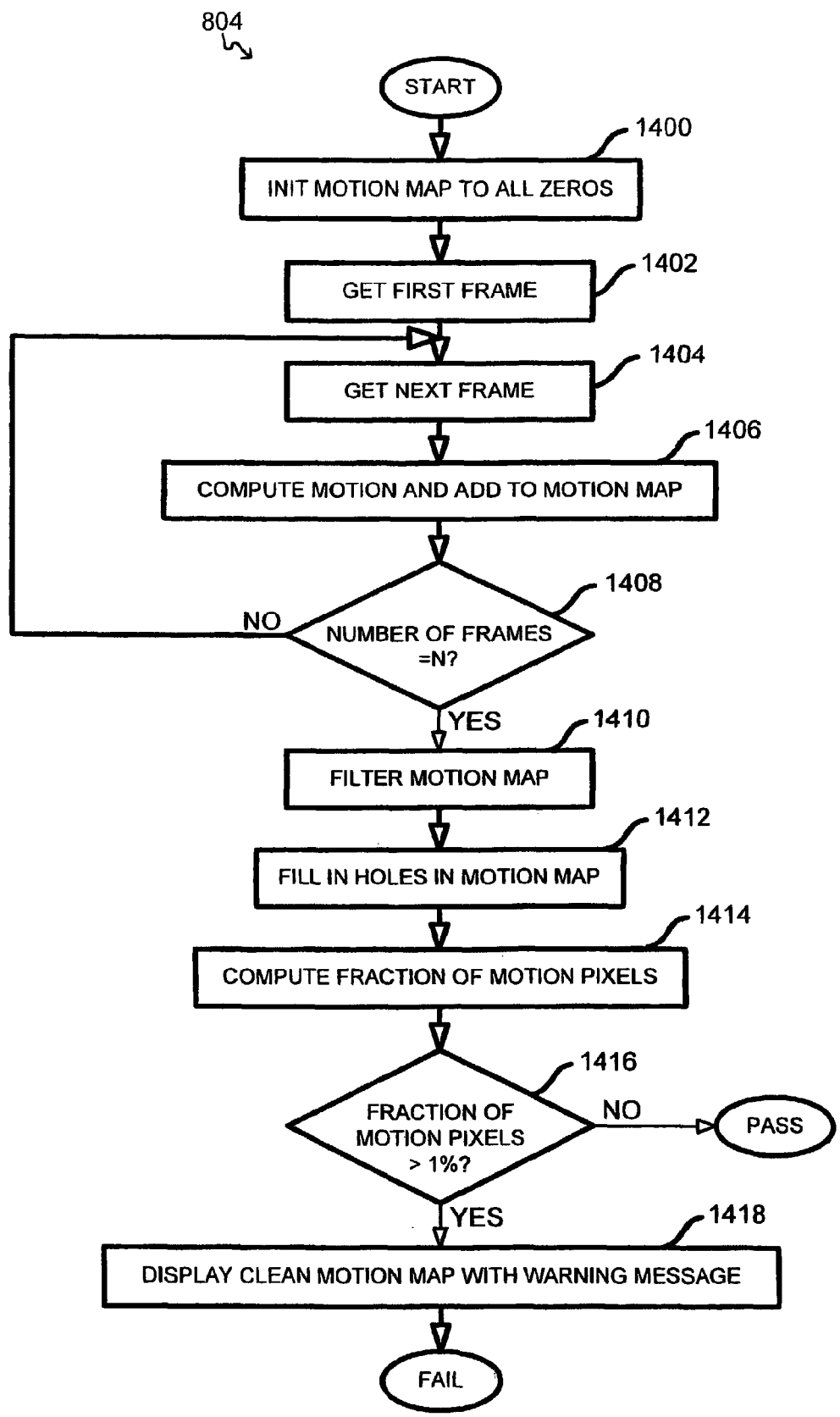
FIG. 14 shows a flowchart for a motion setup test in accordance with an embodiment of the present invention.

FIG. 14 illustrates a flowchart for the motion setup test of operation 804 for determining whether excessively moving background objects are in the field of view of the camera and thereby included in the images generated by the camera. This setup test may be useful for compositing applications that distinguish a subject from the background environment when conducting background substitutions. In such applications, if excessively moving background objects are in the camera's field of view are not detected, then the application may treat the images of the moving background objects as part of the user or subject.

With continuing reference to FIG. 14, in operation 1400 a motion map is initialized to provide a clean motion map. In operation 1402, a first image frame is obtained and in operation 1404, a second subsequent image frame is collected. From these two frames, motion is computed and added to the motion map in operation 1406. Operations 1404 and 1406 are repeated until a predetermined number of image frames ("N") is reached (see operation 1408). In a preferred embodiment of the present invention, the predetermined number "N" of video frames for satisfying operation 1406 may be 32 image frames.

Once the predetermined number of frames is reached, the motion map is filtered in operation 1410 to clear tiny dots and fill in tiny holes in the motion map. This operation is executed to help minimize user confusion with the motion map when it is subsequently displayed. The filtering of the motion map may be performed by using commonly available techniques known to those skilled in the art such as, for example, a Median Filter Technique. More information regarding the Median Filter Technique may be found in "Two-Dimensional Signal and Image Processing" by Jae S. Lim, Prentice-Hall, Englewood Cliffs, N.J., 1990, which is incorporated herein by reference in its entirety.

In operation 1412, larger holes in the motion map are also filled in using commonly available techniques known to those skilled in the art such as, for example, a Connected Componented Algorithm. More information regarding the Connected Componented Algorithm may be found in "Robot Vision" by Berthold K. P. Horn, MIT Press, Cambridge, Mass., 1986, which is incorporated herein by reference in its entirety.

The fraction of the image occupied by moving pixels in the motion map is then computed in operation 1414. If this fraction is less than a predetermined value (i.e., there is less motion detected than a threshold level of motion tolerated by the intended application), the motion setup test is passed. If, on the other hand, the fraction is greater than the predetermined value (i.e., there is more motion detected than a threshold level of motion tolerated by the application), the cleaned up motion map is displayed in operation 1418 to indicate the location of the excessive motion and the motion setup test is failed. As an illustration of operations 1416 and 1418, in one preferred embodiment of the motion setup test, the predetermined value may be 1% so that the motion map is displayed if more than 1% of the pixels of the image are motion pixels.

Figure 15A:
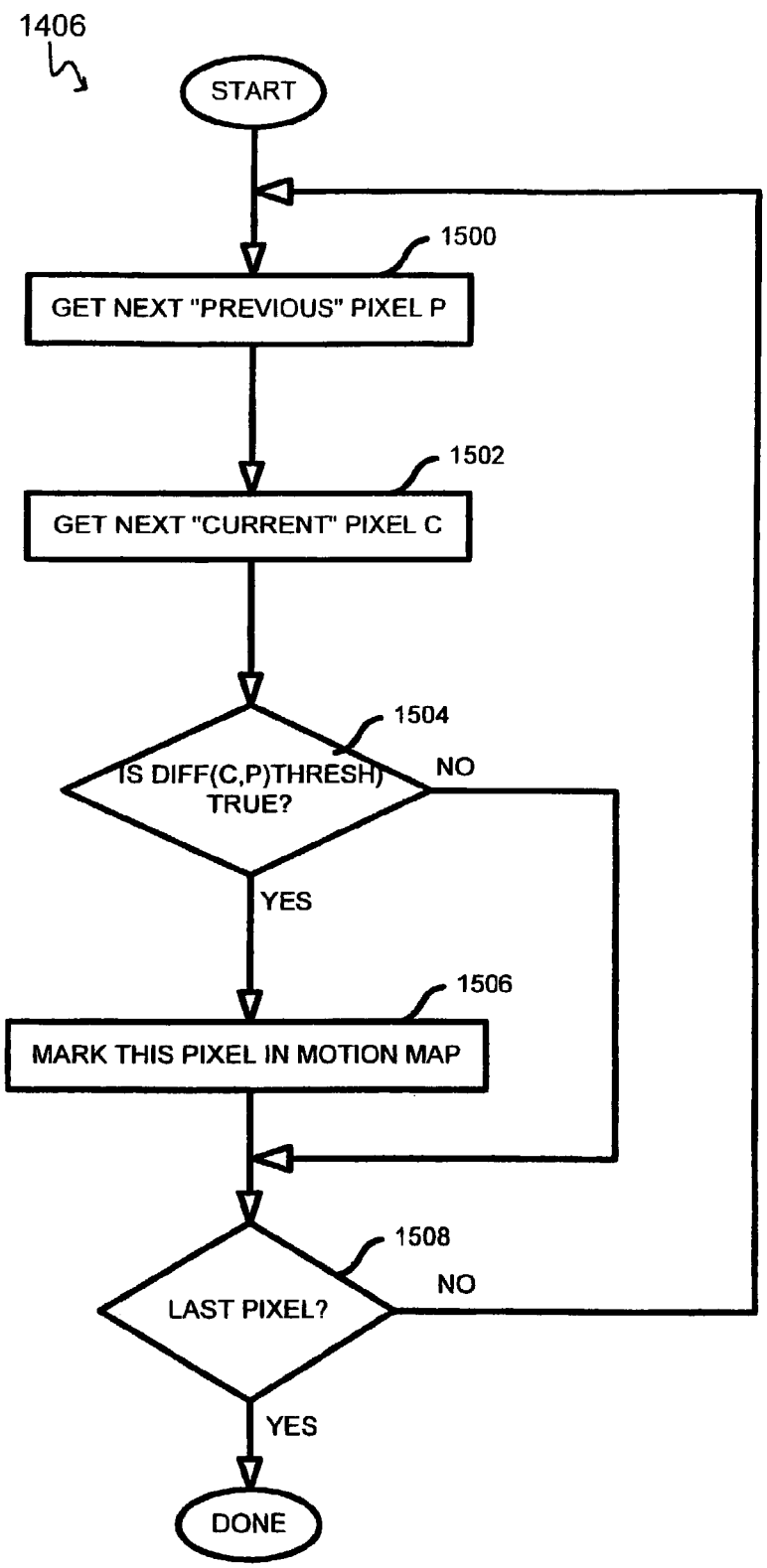
FIG. 15A illustrates a flowchart for a process for computing motion and adding motion to a motion map in accordance with an embodiment of the present invention.

FIG. 15A illustrates a flowchart for a process for operation 1406 for computing motion and adding motion to the motion map. In operation 1500, a previous pixel ("P") is obtained from one image frame (the "previous image frame"). In operation 1502, a current pixel ("C") is obtained from another image frame (the "current image frame") obtained subsequent to the previous image frame. In operation 1504, pixels P and C are used to see if DIFF (C,P Thresh) is true. DIFF (C,P Thresh) is represented by the algorithm:

DIFF(C,P Thresh):=(ABS($C_R$-$P_R$)>Thresh) OR (ABS ($C_G$-$P_G$)>Thresh) OR (ABS($C_B$-$P_B$)>Thresh)

where: $C_R$ and $P_R$ are the red color components of the C and P pixels respectively, $C_G$ and $P_G$ are the green color components of the C and P pixels respectively, and $C_B$ and $P_B$ are the blue color components of the C and P pixels respectively.

If DIFF (C,P Thresh) for a particular pixel is true then that particular pixel is marked in the motion map in operation 1506. Operations 1500, 1502 and 1504 are then repeated.

Figure 15B:
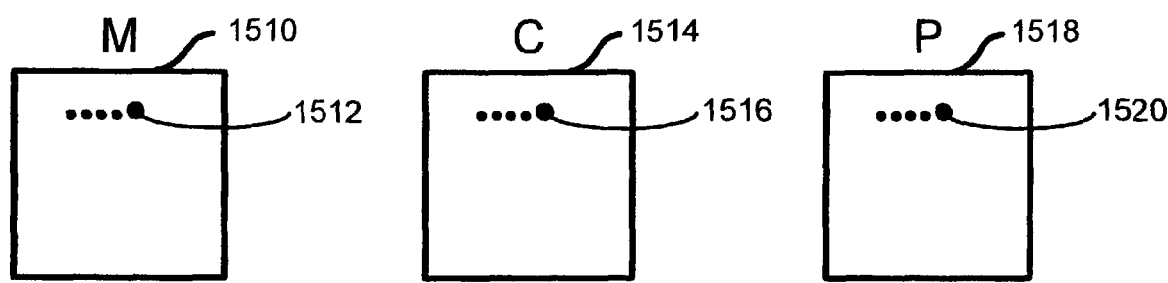
FIG. 15B is a schematic illustration of a motion map ("M"), a current video image frame ("C") and a previous video image frame ("P") according to an embodiment of the present invention.

When this process has been performed on all of the pixels of this pair of image frames, then operation 1406 is completed for this particular pair of collected frames (see operation 1508). For further understanding of this process please refer to FIG. 15B which illustrates a motion map ("M") 1510 with a motion pixel 1512 based on motion of a pixel between a current image frame ("C") 1514 with a Current pixel 1516 and a previous image frame ("P") 1518 with a Previous pixel 1520.

Figure 16:
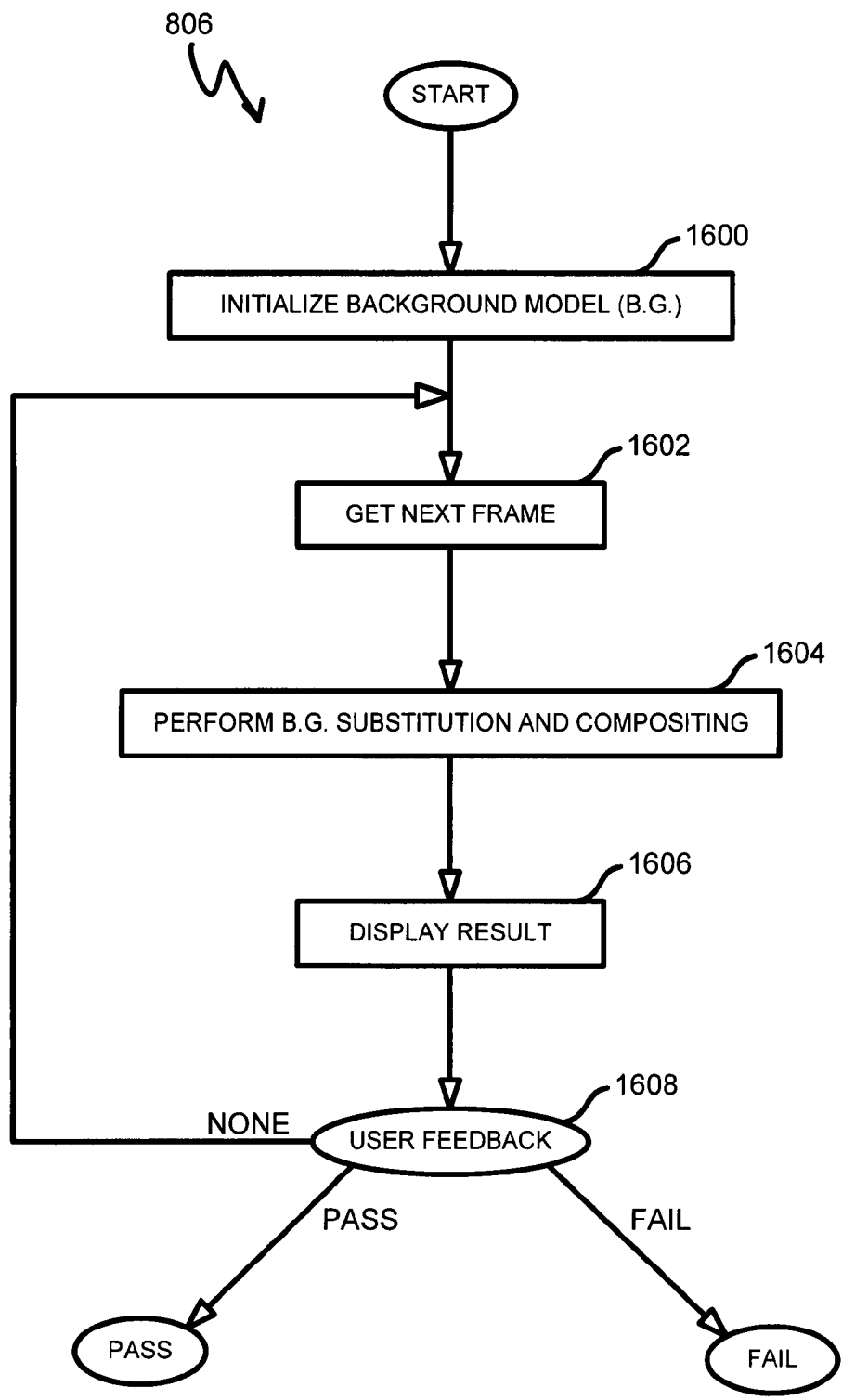
FIG. 16 shows a flowchart which illustrates a process for conducting a compositing setup test according to an embodiment of the present invention.

FIG. 16 illustrates a process for conducting a compositing setup test 806 according to an embodiment of the present invention. In operation 1600, a background model ("B.G") is initialized. In operations 1602 and 1604 an image frame is obtained from the camera and the background model substitution and compositing is performed on the image frame. In operation 1606, the results of the background model substitution and compositing is displayed on the visual display device. After the results have been displayed, the user is polled as to whether the user approves of the displayed results, in other words, whether the user is satisfied with the results. If there is user feedback, depending on the user feedback, the Composing Setup Test may be passed or failed. For example, if the user feedback indicates that the user is satisfied with the results, then the compositing setup test is passed. If, on the other hand, the user feedback indicates that the user is not satisfied with the results, then the compositing setup test is failed. If, in operation 1608, there is no user feedback, then operations 1602, 1604, 1606 are repeated to display the results of a new background model substitution and compositing. This way, if a user is not satisfied with the results, the user may simply wait and not answer the poll until the user is satisfied with the displayed results.

More information regarding the process for conducting the compositing setup test may be found in U.S. patent application Ser. No. 08/951,089 entitled "Method and Apparatus for Model-Based Compositing" by inventor Subutai Ahmad filed on Oct. 15, 1997, in P.C.T. patent application serial number PCT/US98/21999 entitled "Method and Apparatus for Performing a Clean Background Subtraction" by inventor Jeffrey L. Edwards filed on Oct. 15, 1998, and in U.S. patent application Ser. No. 09/174,491 entitled "Method and Apparatus for Performing a Clean Background Subtraction" by inventor Jeffrey L. Edwards filed on Oct. 15, 1998 which are all incorporated herein by reference in their entirety.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present include all such alternatives, modifications, permutations, and equivalents.

What is claimed is:

1. A computer-implemented method comprising:
   under the control of a program executed by a computer system:
   obtaining a set of images generated by a camera;
   analyzing the set of images generated by the camera to calculate a plurality of camera performance values including at least two of an environmental lighting darkness value, an environmental lighting brightness value or a background lighting value;
   comparing at least one calculated camera performance value to at least one camera performance threshold used by an application; and
   if it is determined that the at least one calculated camera performance value fails to satisfy the at least one camera performance threshold:
   presenting a notification to the user that the camera performance threshold was not met; and
   presenting a suggestion message to the user of how to improve the at least one calculated camera performance value by altering the environment in a field of view of the camera while retaining an existing camera configuration.

2. The method of claim 1, wherein presenting a suggestion to the user of how to improve the at least one calculated camera performance value by altering the environment in the field of view of the camera comprises presenting a suggestion to the user to raise or lower environmental lighting.

3. The method of claim 1, wherein presenting a suggestion to the user of how to improve the at least one calculated camera performance value by altering the environment in the field of view of the camera comprises presenting a suggestion to the user to reduce background lighting.

4. The method of claim 1, further comprising:
   analyzing the set of images generated by the camera to calculate at least one camera performance value relating to motion within the field of view of the camera;
   comparing the at least one camera performance value relating to motion to at least one camera performance threshold relating to motion;
   if it is determined that the at least one camera performance value relating to motion fails to satisfy the at least one camera performance threshold relating to motion, presenting a motion map to the user to indicate a location of excessive motion.

5. The method of claim 1, further comprising storing images generated by the camera in a plurality of buffers.

6. The method of claim 1, further comprising, prior to obtaining the set of images generated by the camera:
   activating an autogain of the camera;
   waiting a predetermined amount of time for the autogain of the camera to settle at an optimal video gain value; and
   deactivating the autogain of the camera to set the camera controls to the optimal levels determined by the autogain.

7. The method of claim 1, further comprising determining a position of a subject relative to the field of view of the camera.

8. The method of claim 7, further comprising:
   displaying a body part frame superimposed on an image generated by the camera; and
   receiving an indication that an image of a body part of the subject is positioned in the body part frame.

9. The method of claim 1, wherein analyzing the set of images generated by the camera to calculate a plurality of camera performance values comprises:
   retrieving a test script setting forth a test order; and
   analyzing the set of images in accordance with the test order indicated in the test script.

10. The method of claim 4, wherein the at least one camera performance value relating to motion comprises a measure of an amount of movement detected in the field of view of the camera.

11. The method of claim 1, wherein at least one camera performance threshold is a critical camera performance threshold and at least one camera performance threshold is a non-critical camera performance threshold; and wherein the method further comprises:

aborting further analysis of the set of images upon the determination that the critical camera performance threshold is not met.

12. The method of claim 11, further comprising presenting at least one option to the user upon the determination that the non-critical camera performance threshold has not been met.

13. The method of claim 1, further comprising determining the at least one camera performance threshold used by the application.

14. A computer-readable storage medium having a computer program stored thereon that, in response to execution by a computer, causes the computer to:
  obtain a set of images generated by a camera;
  calculate a plurality of camera performance values based on the set of images generated by the camera, the plurality of camera performance values including at least two of an environmental lighting darkness value, an environmental lighting brightness value or a background lighting value;
  compare at least one camera performance value to a camera performance threshold used by an application; and
  if it is determined that the at least one camera performance value fails to meet the camera performance threshold, present an indication including a message to the user of a step that can be performed for improving the at least one camera performance value, wherein the step comprises altering the environment in a field of view of the camera while retaining an existing camera configuration.

15. A system comprising:
  a processor;
  a camera coupled to the processor; and
  a computer-readable storage medium having a computer program stored thereon that, in response to execution by the processor, causes the system to:
    obtain a set of images generated by a camera;
    calculate a plurality of camera performance values based on the set of images generated by the camera, the plurality of camera performance values including at least two of an environmental lighting darkness value, an environmental lighting brightness value or a background lighting value;
    compare at least one camera performance value to a camera performance threshold used by an application; and
    if it is determined that the at least one camera performance value fails to meet the camera performance threshold, present an indication including a message to the user of a step that can be performed for improving the at least one camera performance value, wherein the step comprises altering the environment in a field of view of the camera while retaining an existing camera configuration.

16. A system comprising:
  means for capturing a set of images;
  means for analyzing the set of images by:
    calculating a plurality of performance values based on the set of images, the plurality of performance values including at least two of an environmental lighting darkness value, an environmental lighting brightness value or a background lighting value; and
    comparing at least one performance value to a performance threshold used by an application; and
  a display on which an indication including a message is presented to the user of a step that can be performed for improving the at least one performance value if it is determined that the at least one performance value fails to meet the performance threshold, wherein the step comprises altering the environment in a field of view of the means for capturing a set of images while retaining an existing configuration of the means for capturing a set of images.

17. A method of configuring an environment surrounding a camera to satisfy predetermined criteria of an application, the method comprising:
  situating the camera within the environment;
  initiating a computer-implemented method comprising:
    obtaining a set of images generated by the camera;
    calculating a plurality of camera performance values based on the set of images generated by the camera, the plurality of camera performance values including at least two of an environmental lighting darkness value, an environmental lighting brightness value or a background lighting value;
    comparing at least one camera performance value to at least one camera performance threshold used by an application; and
    if it is determined that the at least one camera performance value fails to satisfy the at least one camera performance threshold, presenting an indication including a message to the user of a step that can be performed for improving the at least one camera performance value; and
  receiving the indication of the step that can be performed for improving the at least one camera performance value, wherein the step comprises altering the environment in a field of view of the camera while retaining an existing camera configuration.

* * * * *